*(12)* United States Patent
Van Wuyckhuyse et al.

(10) Patent No.: US 9,522,416 B2
(45) Date of Patent: Dec. 20, 2016

(54) CABLE SORTER AUTOMAT AND A METHOD FOR AUTOMATICALLY SORTING CABLES

(71) Applicant: TE Connectivity Nederland BV, s'Hertogenbosch (NL)

(72) Inventors: Louis Van Wuyckhuyse, 's-Hertogenbosch (NL); Ton Van Der Bruggen, Vught (NL)

(73) Assignee: TE Connectivity Nederland BV, S-Hertogenbosch (NL)

( * ) Notice: Subject to any disclaimer, the term of this patent is extended or adjusted under 35 U.S.C. 154(b) by 0 days.

(21) Appl. No.: 14/873,826

(22) Filed: Oct. 2, 2015

(65) Prior Publication Data
US 2016/0023250 A1    Jan. 28, 2016

Related U.S. Application Data

(63) Continuation of application No. PCT/EP2014/055994, filed on Mar. 25, 2014.

(30) Foreign Application Priority Data

Apr. 3, 2013    (EP) .................... 13162187

(51) Int. Cl.
| | | |
|---|---|---|
| *G02B 6/00* | (2006.01) | |
| *B07C 5/38* | (2006.01) | |
| *G02B 6/44* | (2006.01) | |
| *G02B 6/38* | (2006.01) | |
| *H01R 43/28* | (2006.01) | |

(52) U.S. Cl.
CPC .............. *B07C 5/38* (2013.01); *G02B 6/4416* (2013.01); *G02B 6/4439* (2013.01); *G02B 6/3817* (2013.01); *G02B 6/3833* (2013.01); *G02B 6/448* (2013.01); *H01R 43/28* (2013.01)

(58) Field of Classification Search
CPC ... G02B 6/4457; G02B 6/3898; G02B 6/3652; G02B 6/4439; G02B 6/4416; G02B 6/3817; G02B 6/3833; G02B 6/448; G07C 5/38; B07C 5/38; H01R 43/28
USPC ......................... 385/134, 137, 147
See application file for complete search history.

(56) References Cited

U.S. PATENT DOCUMENTS 4,441,786 A * 4/1984 Hulin .................. G02B 6/3878
                                                  385/139
4,572,248 A    2/1986 Pegram et al.
(Continued)

FOREIGN PATENT DOCUMENTS

DE    2842342 B1    8/1979
DE    3703011 A1    8/1988

OTHER PUBLICATIONS

PCT Search Report, International Application No. PCT/EP2014/055994, dated Jun. 26, 2014, 4 pages.
Abstract of DE3703011A1, dated Aug. 18, 1988, 2 pages.

*Primary Examiner* — Ellen Kim
(74) *Attorney, Agent, or Firm* — Barley Snyder

(57) ABSTRACT

A cable sorter for a plurality of cables is provided and includes a cable receiving device and a cable assembly device. The cable receiving device includes a plurality of cable receiving grooves, while the cable assembly device includes a cable feeding passageway. The cable feeding passageway is positioned to correspond with the plurality of cable receiving grooves.

19 Claims, 5 Drawing Sheets

(56) References Cited

U.S. PATENT DOCUMENTS

| | | | | |
|---|---|---|---|---|
| 4,795,230 A | * | 1/1989 | Garcia | G02B 6/4407 |
| | | | | 242/128 |
| 4,812,010 A | | 3/1989 | Osaka et al. | |
| 4,997,173 A | | 3/1991 | Folk et al. | |
| 6,256,443 B1 | * | 7/2001 | Uruno | G02B 6/4452 |
| | | | | 385/134 |
| 6,389,214 B1 | * | 5/2002 | Smith | G02B 6/4472 |
| | | | | 385/136 |

* cited by examiner

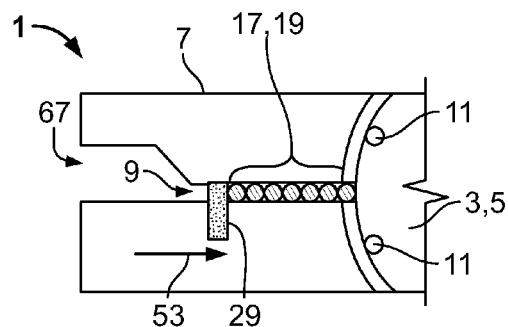
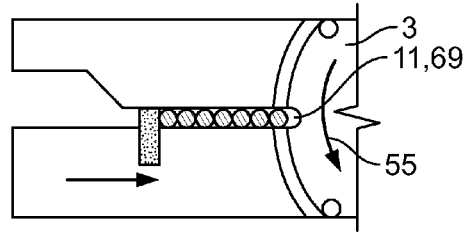
Fig. 5        Fig. 6
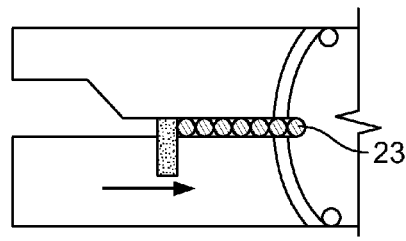
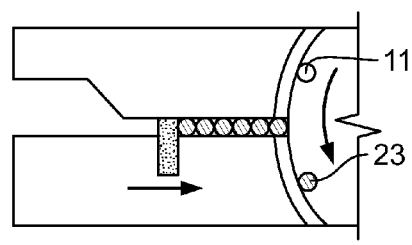
Fig. 7        Fig. 8
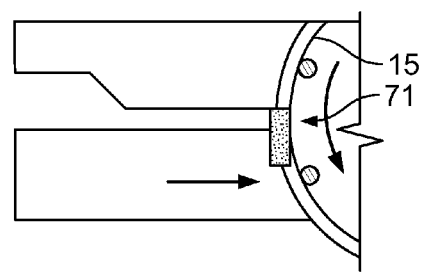
Fig. 9

CABLE SORTER AUTOMAT AND A METHOD FOR AUTOMATICALLY SORTING CABLES

CROSS-REFERENCE TO RELATED APPLICATION

This application is a continuation of International Application No. PCT/EP201/055994 claiming the benefit of the filing date under 35 U.S.C. §119(a)-(d) of European Patent Application No. 13162187.2 filed on Apr. 3, 2013.

FIELD OF THE INVENTION

The invention relates to a cable sorter and, in particular, to a cable sorter for automatically rearranging a plurality of cables of a predefined cable diameter in a predetermined sequence.

BACKGROUND

Sorting and rearranging cables in a predetermined sequence is generally performed manually using basic tools. Manual sorting and rearranging of cables is a time consuming process. Manual sorting is also susceptible to mistakes being made in the cable sequence. Other disadvantages of a manual sorting and rearranging process are the risks of damage to the cables and compromising the purity of the cable with debris during the process. When handling optical fibers, even the smallest impurities or small damages done to the cable, for example by bending of the cable below a tolerable bending radius, can lead to a failure or complete breakdown of the cable function.

SUMMARY

It is an object of the invention to provide a cable sorter for a plurality of cables. The cable sorter includes a cable receiving device and a cable assembly device. The cable receiving device includes a plurality of cable receiving grooves, while the cable assembly device includes a cable feeding passageway. The cable feeding passageway is positioned to correspond with the plurality of cable receiving grooves.

BRIEF DESCRIPTION OF THE DRAWINGS

The above and other features of the invention will become more apparent by describing in detail exemplary embodiments thereof with reference to the accompanying drawings, in which

FIG. 5 is a schematic diagram showing a process step of feeding a plurality of cables using a cable sorter according to the invention;

FIG. 6 is a schematic diagram showing another process step of feeding the plurality of cables using the cable sorter according to the invention;

FIG. 7 is a schematic diagram showing another process step of feeding the plurality of cables using the cable sorter according to the invention;

FIG. 8 is a schematic diagram showing another process step of feeding the plurality of cables using the cable sorter according to the invention;

FIG. 9 is a schematic diagram showing another process step of feeding the plurality of cables using the cable sorter according to the invention;

DETAILED DESCRIPTION OF THE EMBODIMENT(S)

The structure and function of a cable sorter according to the invention will be described with reference to FIGS. 1 to 4.

Figure 1:
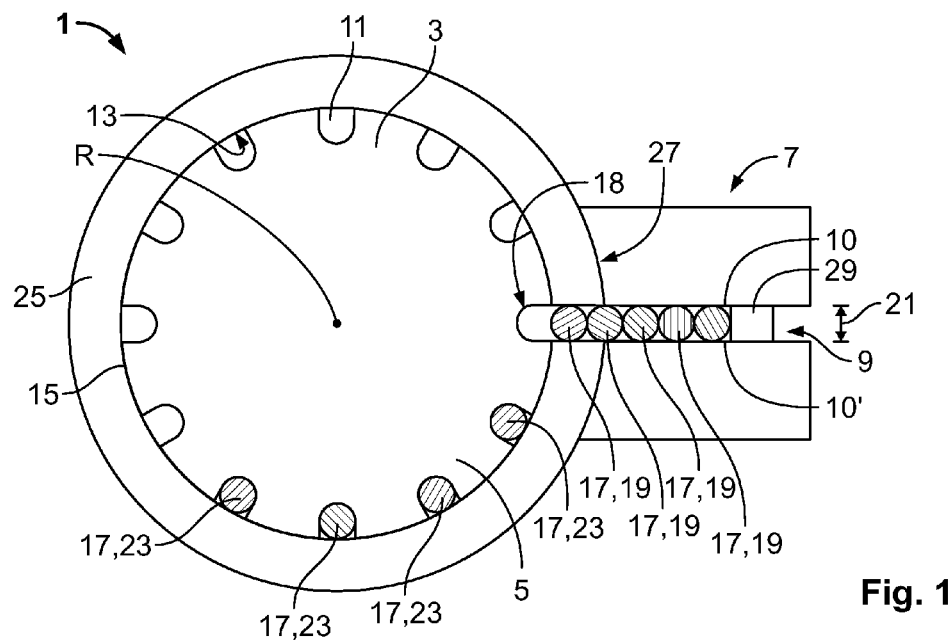
FIG. 1 is a schematic sectional view of a cable sorter according to the invention.

With respect to FIG. 1, a cable sorter 1 according to the invention is shown and includes a revolving cylinder 3 with a cable receiving device 5 and a cable assembly device 7 with a cable feeding passageway 9.

The cable receiving device 5 includes a plurality of cable receiving grooves 11. The cable receiving grooves 11 open up along a radial direction of the revolving cylinder 3. Each cable receiving groove 11 includes a cable receiving passageway 13 facing away from the rotational axis R and is aligned with a cylinder surface 15 of the revolving cylinder 3. In the shown embodiment, one of the cable receiving grooves 11 is shown in a transport position 18 and its cable receiving passageway 13 is aligned with the cable feeding passageway 9.

As shown, the cable receiving grooves 11 are arranged equally spaced from each other around the cylinder surface 15.

As shown in FIG. 1, a portion of each cable 17 is positioned in the cable feeding passageway 9 and arranged in the transfer position 19. The cable feeding passageway 9 includes positioning surfaces 10 and 10' and aligns the cables 17 in a flat and parallel order.

The cables 17 that are located in cable receiving grooves 11 of the cable receiving device 5 are arranged in a storage position 23.

A stationary retention member 25 is arranged around the revolving cylinder 3 and effectively covers the cable receiving grooves 11. The stationary retention member 25 secures the cables 17 inside the cable receiving grooves 11 during rotational movement of the revolving cylinder 3.

The stationary retention member 25 includes a transfer opening 27, which allows the cables 17 to transfer between the cable assembly device 7 and the cable receiving grooves 11. The stationary retention member 25 in the shown embodiment is a mechanical bearing for the revolving cylinder 3.

A cable transfer member 29 is also provided to feed the cables 17 through cable feeding passageway 9 and into the cable receiving device 5. The cable transfer member 29 urges the cables 17 from a transfer position 19 in a direction towards the cable receiving device 5.

Figure 2:
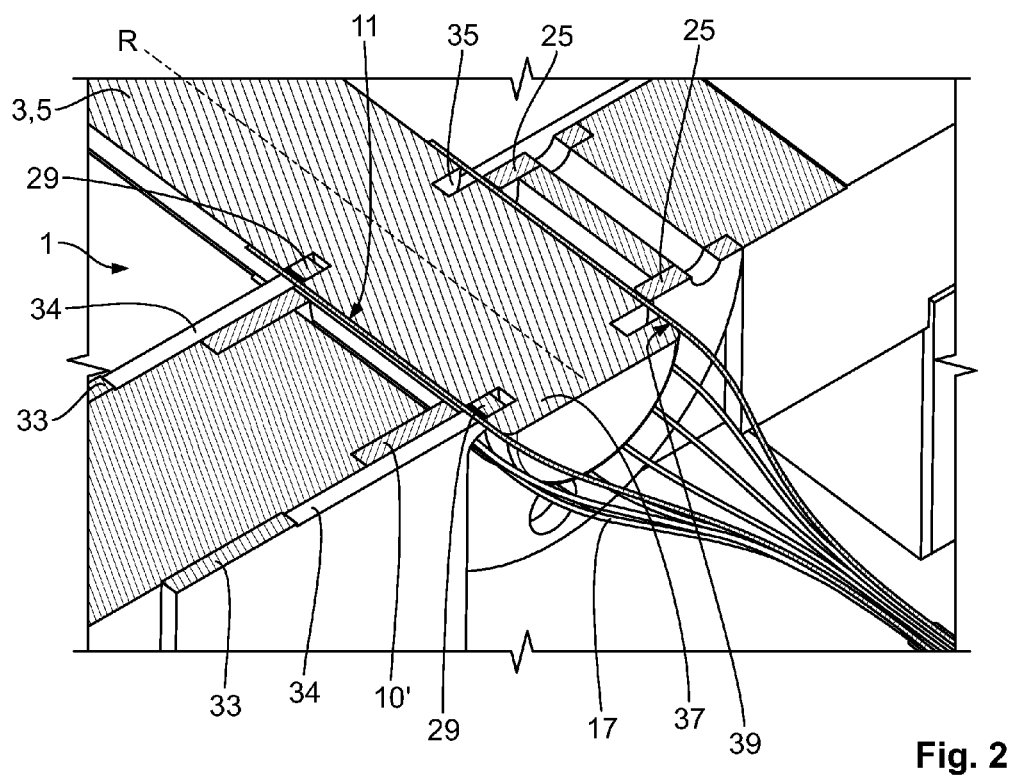
FIG. 2 is a sectional perspective view of a cable sorter according to the invention taken along a horizontal cross-section thereof.

As shown in FIG. 2, a plurality of cables 17 are positioned in the cable receiving grooves 11 around the revolving cylinder 3 and with the cable transfer member 29 being located in an extraction position 31.

The cable receiving grooves 11 are aligned parallel to the rotational axis R. The cable sorter 1 may include two stationary retention members 25, as shown. The stationary retention members 25 are positioned to support and retain the revolving cylinder 3 during rotational movement the revolving cylinder 3.

In the shown embodiment, the cable sorter 1 further includes cable transfer supports 33 that are used to support the cable transfer members 29. Each cable transfer supports 33 may be connected to a drive, which may include a motor or an actuator.

As shown in FIG. 2, the cable sorter 1 may include two cable transfer members 29 that are spaced apart from each other along a length thereof, which is parallel to the rotational axis R. The cable transfer members 29 may be protrusions extending from the cable transfer supports 33 and include a cable support surface 34 which is formed as a recess in the shown embodiment. The cable support surface 34 may be aligned with the positioning surface 10' when the cable transfer member 29 is in the extraction position 31.

The two stationary retention members 25 are spaced apart from each other and are enclosed between the two cable transfer members 29. Alternatively, the stationary retention members 25 can be arranged such that the cable transfer members 29 are positioned between them.

In the shown embodiment of FIG. 2, the revolving cylinder 3 includes two cable transfer passageways 35. The cable transfer passageways 35 are channels that encircle the revolving cylinder 3 around the rotational axis R. The cable transfer passageways 35 allow the cable transfer members 29 to move into the extraction position 31, in which the cable transfer members 29 penetrate the cable transfer passageways 35.

In the shown embodiment, the revolving cylinder 3 further includes an alignment Member 37 having an alignment surface 39 to pre-align cables 17 to maintain an uncoiled alignment of the cables 17 that are located in cable receiving grooves 11.

Figure 3:
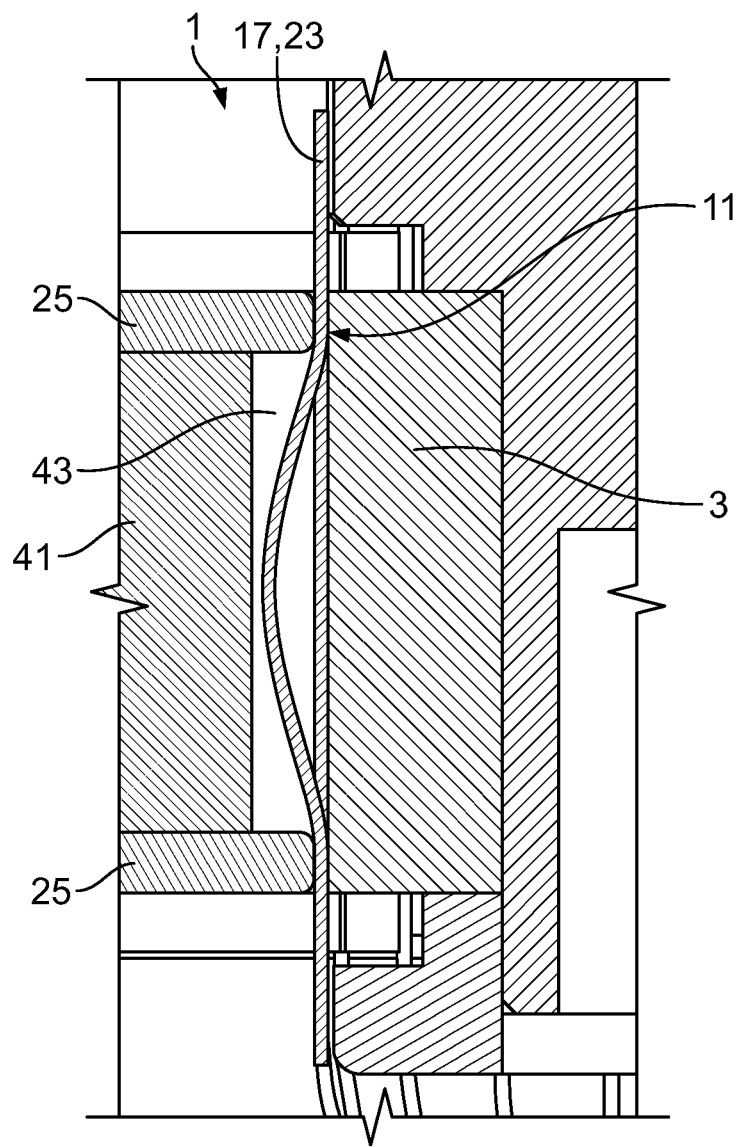
FIG. 3 is a top view of the cable sorter of FIG. 2.

With reference to FIG. 3, that cable sorter 1 may further include a housing 41 that partially surrounds the revolving cylinder 3. Additionally, a tolerance section 43 is provided between the revolving cylinder 3 and the housing 41. The tolerance section 43 surrounds the revolving cylinder 3 and provides space for cables 17 that are in the storage position 23 to at least partially bend out of the cable receiving grooves 11. By allowing the cables 17 to bend at least partially out of the cable receiving grooves 11, damage to the cables 17 can be prevented. Additionally, the risk of a cable that prevents movement of the revolving cylinder 3, by getting stuck between the revolving cylinder 3 and the housing 4, is effectively reduced. The tolerance section 43 may be enclosed by the stationary retention members 25.

Figure 4:
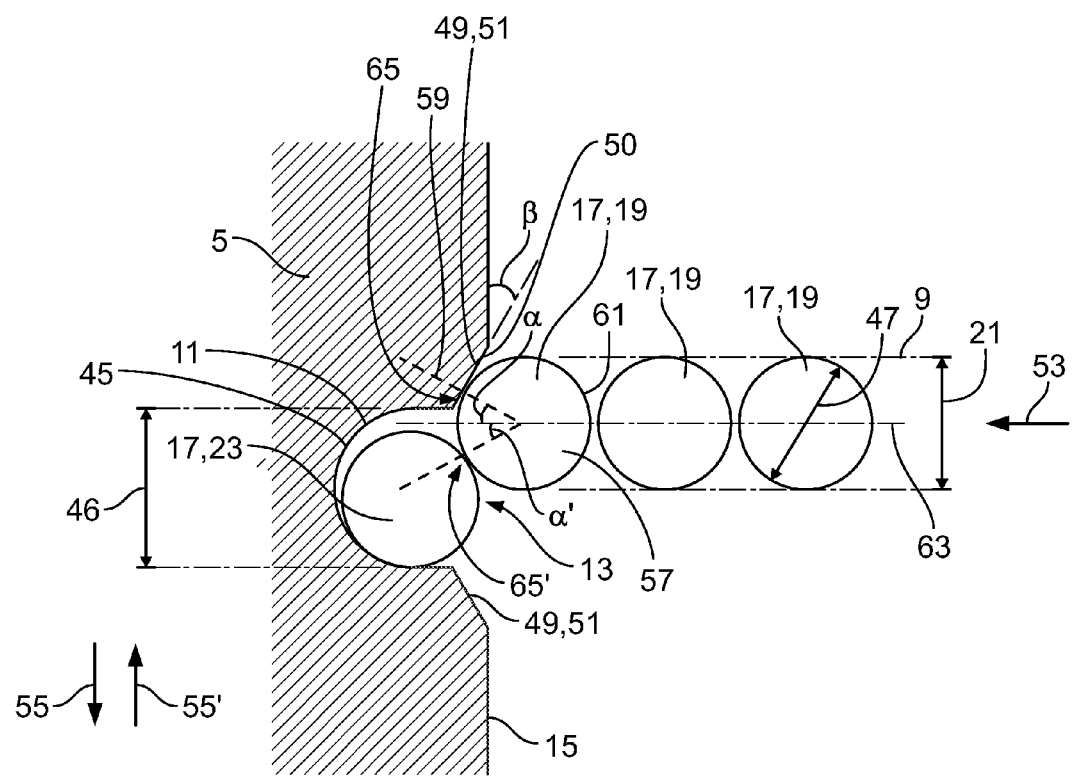
FIG. 4 is a side view of a cable receiving groove of a cable sorter according to the invention.

With respect to FIG. 4, the cable receiving groove 11 is a rounded receptacle 45 in the shown embodiment. The width 46 of the receptacle 45 is preferably chosen to be between 110% and 130% of the cable diameter 47. The cable receiving passageway 13 of the cable receiving groove 11 may be limited by deflection surfaces 49. The deflection surfaces 49 may be formed as flat areas 51, as shown. The deflection surfaces 49 can alternatively be curved.

When the cables 17 are positioned from the transfer position 19 into the storage position 23, the cables 17 are urged along a feeding direction 53 towards the cable receiving device 5.

After one cable 17 has been placed in a cable receiving groove 11 and is therefore in the storage position 23, the cable receiving device 5 may be moved along a feeding direction 55 or 55' to place a cable 17 in the next empty cable receiving groove 11 in front of the cable feeding passageway 9. The deflection surface 49 effectively push the cables 17 that are in the transfer position 19 into the cable feeding passageway 9 in a direction opposite to the feeding direction 53. The deflection surface 49 applies pressure to the cable 17, which is in a deflection position 57 that is defined as being the position of cable 17 that is in the transfer position 19 and being located adjacent to a cable receiving groove 11.

The deflection surfaces 49 each have a width 50 which is preferably between 50% and 100% of the cable diameter 47. A direction of the deflection surface 49 includes a vector having a component that is parallel to a cylindrical surface 15 of the cable receiving device 5 and another component that is perpendicular to the surface 15 of the cable receiving device 5.

The deflection surface 49 applies pressure onto the cable 17 when in the deflection position 57 by a pressure angle $\alpha$. The pressure angle $\alpha$ is defined as the angle between a contact surface 59 on a cable surface 61 and a center line 63 of the cable feeding passageway 9, wherein the contact surface 59 is located at a contact point 65 between the cable 17 and the deflection surface 49. The pressure angle $\alpha$ is preferably around 30° in order to avoid cable damage.

During movement of the cable receiving device 5 in a feeding direction 55', deflection surface 49 applies pressure on a cable 17 being in the deflection position 57 by a pressure angle $\alpha'$. The pressure angle $\alpha'$ is defined as the angle between a contact surface 59' on the cable surface 61 and the center line 63 of the cable feeding passageway 9, wherein the contact surface 59' is located at a contact point 65' of the cable 17 being in the storage position 23 and the cable 17 being the deflection position 57.

The deflection surface 49 applies pressure onto the cable 17 in the deflection position 57 by the pressure angle $\alpha$ which is similar to the pressure angle $\alpha'$, at which a cable 17 that is in the storage position 23 applies pressure to the cable 17 that is at the deflection position 57 when the cable receiving device 5 moves along the feeding direction 55'.

In the embodiment, the deflection surface 49 is flat. The angle $\beta$ between the flat area 51 and the surface 15 of the cable receiving device 5 adjacent to the cable receiving passageway 13 is preferably chosen to be between 25° and 35°.

The geometry of the deflection surfaces 49 may vary depending on the cable diameter 47 and the width 46 of the receptacle 45. The geometry may be adapted in order to form deflection surfaces 49 which push cables 17 in a direction towards the cable feeding passageway 9.

The cable feeding passageway 9 may be adapted to force cables 17 in a flat and parallel manner. The width 21 of the cable feeding passageway 9 may be adapted to prevent one cable 17 to move pass another cable 17 and to change the sequence. It may be adapted to force the cables in a flat and parallel manner. The width 21 of the cable feeding passageway 9 is preferably chosen to be at least 100% and less than 200% of the cable diameter 47 to keep the cables 17 in the flat and parallel arrangement. An advantageous width 21 of the cable feeding passageway 9 may be 120% of the cable diameter 47.

The cable sorter 1 may include a cable sensor (not shown), which is directed onto cables 17, with the cables 17 being located in a cable feeding passageway 9 or in the cable receiving device. The cable sensor is adapted to detect a cable identification characteristic and to transmit a cable sequence signal to a control module. A cable sensor may detect and recognize the individual cables of a plurality of cables 17 in order to determine the actual cable sequence prior or after the sorting and rearranging process.

The control module may include a comparator (not shown), which is adapted to compare the cable sequence signal to a predefined target sequence, and wherein the control module is operatively connected to a drive, moving at least one of the cable receiving device 5 and the cable transfer member 29. The control module may be fed with a desired target sequence of the cables. 17 The comparator may compare the actual cable sequence with the target sequence and may, if the actual sequence differs from the target sequence, operate the drive and control the sorting and rearranging process.

Now with reference to FIGS. 5 to 9 and 10 to 14, process steps for sorting cables 17 using a cable sorter 1 according to the invention will be described.

As shown in FIGS. 5 to 9, a transfer process wherein cables 17 are loaded into a cable sorter 1 according to the invention is illustrated. In order to keep a clear presentation of the process steps, reference signs of elements which do not differ in the figures are not shown in FIGS. 5 through 9.

FIG. 5 shows cables 17 loaded into the cable feeding passageway 9 in a transfer position 19. At least one cable transfer member 29 keeps the cables 17 located inside the cable feeding passageway 9 and may be adapted to urge the cables 17 together. The cable transfer member 29 may be spring loaded to bias and apply pressure onto the cables 17 along the feeding direction 53.

The cable receiving device 5, which is formed as a revolving cylinder 3, is not yet in a position in which a cable receiving groove 11 is in a transport position 18 and aligned to the cable feeding passageway 9. In this process step, the cable sequence may be detected by a cable sensor in order to determine the actual cable sequence.

The cable assembly device may include an insertion opening 67, adapted to facilitate the easy insertion of cables 17 into the cable feeding passageway 9.

As shown in FIG. 6, the revolving cylinder 3 rotates around the rotational axis R in the feeding direction 55. The revolving cylinder 3 has been rotated until one cable receiving groove 11 is aligned to the cable feeding passageway 9, being in the transport position 18. The cable receiving groove 11 is now ready to receive a cable 17 from the cable feeding passageway 9. The cable 17 that is located closest to the revolving cylinder 3, but not received in a cable receiving groove 11, is in the deflection position 57.

With respect to FIG. 7, the cable sorter 1 is shown after the cable transfer member 29 has moved along the feeding direction 53 for a distance substantially equal to the diameter 47 of one cable 17. The cable 17 that was in the deflection position 57 has been moved into the cable receiving groove 11, being now in the storage position 23.

FIG. 8 shows the cable sorter 1 after the revolving cylinder 3 has been rotated partially in the feeding direction 55, transporting the cable 17 that is in the storage position 23 along the feeding direction 55 and, at the same time, moving an empty cable receiving groove 11 in a direction towards the cable feeding passageway 9. For the cables 17 that are in the transfer position 19, the process steps shown in the FIGS. 5 to 8 are now repeated until all cables 17 have been inserted into cable receiving grooves 11, the cables 17 then being in the storage position 23.

FIG. 9 shows the situation when all cables 17 are received in the cable receiving grooves 11 and the cable feeding passageway 9 is empty. The cable transfer member 29 has moved along the feeding direction 53 until it aligns with the cylinder surface 15, closing the cable feeding passageway 9 to prevent cables 17 from accidentally moving into the cable feeding passageway 9. The cable transfer member 29 is now located at a closing position 71.

FIGS. 10-14 schematically shows the process of transferring cables 17 from the cable receiving device 5 into a cable feeding passageway 9.

Figure 10:
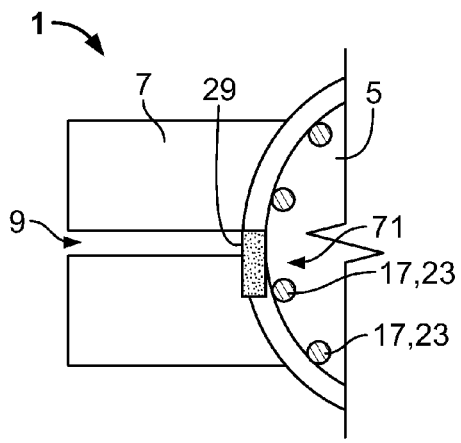
FIG. 10 is a schematic diagram showing a process step of extracting a plurality of cables from a cable sorter according to the invention.

FIG. 10 resembles the situation of FIG. 9. The cables 17 are received in the cable receiving grooves 11 in the cable receiving device 5 and the cable transfer member 29 is located at the closing position 71.

Figure 11:
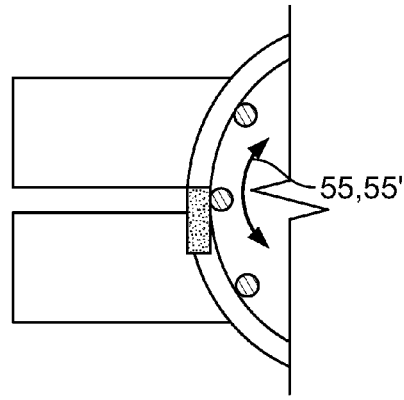
FIG. 11 is a schematic diagram showing another process step of extracting the plurality of cables from the cable sorter according to the invention.

FIG. 11 shows the first step of an extracting process. According to a predetermined cable sequence, the revolving cylinder 3 may rotate in any of the feeding directions 55 or 55' to align a first cable 17 that is to be extracted according to the desired cable sequence to the cable feeding passageway 9.

Figure 12:
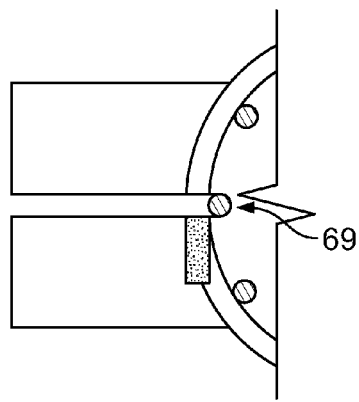
FIG. 12 is a schematic diagram showing another process step of extracting the plurality of cables from the cable sorter according to the invention.

FIG. 12 presents the situation when the predetermined cable 17 that is to be transferred from the cable receiving device 5 into the cable feeding passageway 9 is aligned in front of the cable feeding passageway 9, which means that the cable receiving groove 11 that is carrying the cable 17 is in the transport position 18. The cable transfer member 29 may now be moved out of the closing position 71, opening the cable receiving groove 11 to the cable feeding passageway 9.

Figure 13:
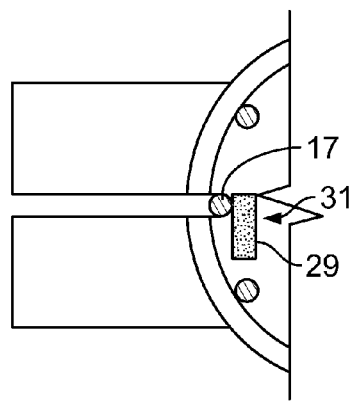
FIG. 13 is a schematic diagram showing another process step of extracting the plurality of cables from the cable sorter according to the invention.

FIG. 13 shows the cable transfer member 29 after being moved into the extraction position 31, in which the cable 17 is located between the cable feeding passageway 9 and the cable transfer member 29. The cable transfer member 29 may have been moved around the cable 17 being in the storage position 23.

Figure 14:
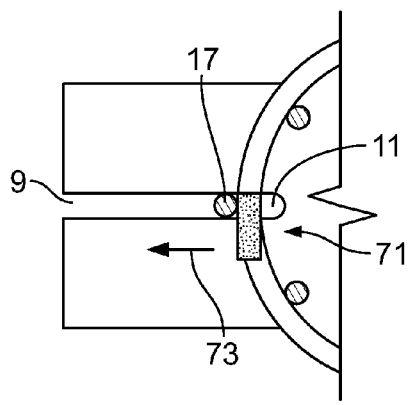
FIG. 14 is a schematic diagram showing another process step of extracting the plurality of cables from the cable sorter according to the invention.

FIG. 14 shows the situation after the cable transfer member 29 has been urged along the extracting direction 73 back into the closing position 71. During movement along the extracting direction 73, the cable transfer member 29 has transferred the cable 17 out of the cable receiving groove 11 into the cable feeding passageway 9.

The cable transfer member 29 will subsequently remain in the closing position 71 while the revolving cylinder 3 rotates in one of the feeding directions 55 or 55' in order to move the next predetermined cable 17 to the cable feeding passageway 9. Subsequently, the process steps shown in FIGS. 10 to 14 will be repeated until all predetermined cables 17 are extracted from the cable receiving device 5 into the cable feeding passageway 9.

It should be appreciated for those skilled in this art that the above embodiments are intended to be illustrative, and can be improved by those skilled in the art. The structures described in the various embodiments may be freely combined without a confliction of the structure or principle.

Although exemplary embodiments of the present disclosure are described in detail with reference to the attached drawings, the embodiments disclosed in the drawings are intended to be illustrative to the preferable embodiments of the present disclosure and should not be construed as a limitation to the present disclosure.

Although several exemplary embodiments of the overall concept of the present closure have been shown and described, it would be appreciated by those skilled in the art that various changes or modifications may be made in these embodiments without departing from the principles and spirit of the disclosure, the scope of which is defined in the claims and their equivalents.

It should be noted that the word "comprising" or "including" does not exclude the presence of elements or steps other than those listed in a claim, unless such exclusion is explicitly stated. The word "a" or "an" preceding an element does not exclude the presence of a plurality of such elements, unless such exclusion is explicitly stated. Further, the reference signs should not be construed as a limitation to the protection scope of the disclosure.

What is claimed is:

1. A cable sorter for a plurality of cables, comprising:
   a cable receiving device with a plurality of cable receiving grooves;
   a cable assembly device with a cable feeding passageway and corresponding with the plurality of cable receiving grooves; and
   a stationary retention member enclosing the plurality of cable receiving grooves that are not aligned with the cable feeding passageway.

2. The cable sorter according to claim 1, wherein the cable feeding passageway includes a pair of positioning surfaces that face and extend parallel with respect to each other.

3. The cable sorter according to claim 2, wherein a width of the cable feeding passageway between 100% and 200% of a diameter of the plurality of cables.

4. The cable sorter according to claim 3, wherein the plurality of cable receiving grooves includes a cable receiving passageway that aligns with the cable feeding passageway.

5. The cable sorter according to claim 4, wherein a diameter of the plurality of cable receiving grooves is between 110% and 130% of the diameter of the plurality of cables.

6. The cable sorter according to claim 5, wherein the cable receiving passageway is limited by a deflection surface.

7. The cable sorter according to claim 6, wherein the deflection surface includes a vector having a first component parallel to a surface of the cable receiving device and a second component perpendicular to the surface of the cable receiving device.

8. The cable sorter according to claim 7, wherein the deflection surface is substantially flat.

9. The cable sorter according to claim 1, wherein further comprising a cable transfer member movable along the cable feeding passageway.

10. The cable sorter according to claim 9, wherein the cable transfer member is aligned and corresponds with the plurality of cable receiving grooves.

11. The cable sorter according to claim 10, wherein the cable receiving device includes a cable transfer passageway that opens towards a surface of the cable receiving device.

12. The cable sorter according to claim 1, wherein the cable receiving device includes a cylinder revolvable around a rotational axis and the plurality of cable receiving grooves disposed along a surface thereof.

13. The cable sorter according to claim 11, wherein the cable transfer passageway is a continuous channel.

14. A cable sorter for a plurality of cables, comprising:
    a cable assembly device with a cable feeding passageway; and
    a cable receiving device with a plurality of cable receiving grooves, each of the plurality of cable receiving grooves including a cable receiving passageway that aligns with the cable feeding passageway, each cable receiving passageway limited by a deflection surface which is angled with respect to the cable receiving device.

15. The cable sorter according to claim 14, wherein an angle between the deflection surface and the surface of the cable receiving device is between 25° and 35°.

16. A cable sorter for a plurality of cables, comprising:
    a cable receiving device with a plurality of cable receiving grooves;
    a cable assembly device with a cable feeding passageway and corresponding with the plurality of cable receiving grooves; and
    a cable transfer member movable along the cable feeding passageway.

17. The cable sorter according to claim 16, wherein the cable transfer member is aligned and corresponds with the plurality of cable receiving grooves.

18. The cable sorter according to claim 17, wherein the cable receiving device includes a cable transfer passageway that opens towards a surface of the cable receiving device.

19. The cable sorter according to claim 18, wherein the cable transfer passageway is a continuous channel.

* * * * *